US006228783B1

(12) United States Patent
Foster, Jr. et al.

(10) Patent No.: US 6,228,783 B1
(45) **Date of Patent: *May 8, 2001**

(54) LAUNDRY ARTICLE WHICH ATTRACTS SOIL AND DYES

(75) Inventors: Alvie L. Foster, Jr.; Ivonne C. Weidner, both of Chattanooga; Klein A. Rodrigues, Signal Mountain; Allen M. Carrier, Hixson, all of TN (US)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/223,942

(22) Filed: Dec. 31, 1998

(51) Int. Cl.[7] .......... C08G 12/00

(52) U.S. Cl. .......... 442/121; 442/130; 442/164; 442/171

(58) Field of Search .......... 442/121, 130, 442/164, 170, 171

(56) References Cited

U.S. PATENT DOCUMENTS

| | | | | |
|---|---|---|---|---|
| 3,909,200 | | 9/1975 | Redmore | 21/2.7 |
| 5,260,385 | | 11/1993 | Iio | 525/328.2 |
| 5,698,476 | | 12/1997 | Johnson et al. | 442/121 |
| 6,008,316 | * | 12/1999 | Foster, Jr. et al. | 528/220 |

FOREIGN PATENT DOCUMENTS

| | | | |
|---|---|---|---|
| 2814287 | 10/1979 | (DE) | C11D/3/28 |
| 4027832 | 3/1992 | (DE) | C11D/17/08 |
| 0 327 927 | 8/1989 | (EP) | C11D/3/37 |
| 0 372 291 | 6/1990 | (EP) | C11D/3/37 |

* cited by examiner

*Primary Examiner*—Elizabeth M. Cole
(74) *Attorney, Agent, or Firm*—Thomas F. Roland, Esq.

(57) ABSTRACT

A laundry article effective for inhibiting transfer of extraneous dyes and soil to articles in a wash liquor, said laundry article comprising a support matrix and a functionalized polyamine attached to or entrapped in the support matrix. The functionalized polyamine comprises the reaction product of (A) a cyano- or guanidino-containing compound and (B) a polyamine prepared from at least one monomeric amine. The laundry article inhibits dye transfer, soil redeposition, and provides color protection to fabrics in a wash liquor. In addition, the laundry article does not interfere with the removal of stains from fabrics washed in the presence of the laundry article. Furthermore, the laundry article containing the functionalized polyamines are economical and environmentally safe.

27 Claims, No Drawings

LAUNDRY ARTICLE WHICH ATTRACTS SOIL AND DYES

FIELD OF THE INVENTION

The present invention relates to a method for removing extraneous random, free flowing dyes and soil from laundry washing applications which contain wash articles for which association of such random dyes and soil is undesirable. More particularly, the method involves the use of a laundry article containing a functionalized polyamine.

BACKGROUND OF THE INVENTION

One of the most persistent and troublesome problems arising during modern fabric laundering operations is the tendency of some colored fabrics to release dye into the laundering solutions. The dye is then transferred onto other fabrics being washed therewith. Another problem is the undesired removal of dyes, causing the premature fading of the fabric, thereby reducing the fabric aesthetic qualities.

An additional problem arising during modern fabric laundering operations is the tendency of soil in the wash water depositing on cleaned fabrics. This is especially evident in low water laundering operations.

One way of overcoming the first problem would be to complex or adsorb the fugitive dyes washed out of dyed fabrics before they have the opportunity to become attached to other articles in the wash. This is termed anti-dye transfer. A solution to the second problem would be to minimize or prevent the desorption of dyes from the fabric during the laundering process. This is termed color protection. A solution to the third problem would be to complex or adsorb the soil in the wash water before it can deposit on cleaned articles in the wash. This is termed anti-redeposition.

Polymers have been used in detergent compositions to inhibit dye transfer. One type of such polymers are N-vinylimidazole homo- and copolymers. Examples of said polymers are described in DE 2 814 287-A which describes detergent compositions containing N-vinyl imidazole homo- or copolymer in combination with anionic and/or nonionic surfactants and other detergent ingredients. EP 372 291 describes a process for washing discoloration-sensitive textiles. The wash liquor contains anionic/nonionic surfactants and water soluble polymers, for example, copolymers N-vinylimidazole, N-vinyloxazolidone or N-vinylpyrrolidone. EP 327 927 describes a granular detergent additive comprising water-soluble polymeric compounds based on N-vinylpyrrolidone and/or N-vinylimidazole and/or N-vinyloxazolidone and cationic compounds. DE 4027832-A describes electrolyte-free liquid detergent compositions comprising zeolite A, nonionic surfactants and dye transfer inhibiting polymers. The dye transfer inhibiting polymers are homo- and copolymers selected from N-vinylpyrrolidone and/or N-vinylimidazole and/or N-vinyloxazolidone.

Biguanidine polymers have been successfully employed in a variety of applications. For example, U.S. Pat. No. 5,260,385 describes biguanidine polymers containing a multiplicity of biguanide groups for use as a germicide or antimicrobial. U.S. Pat. No. 3,909,200 describes corrosion inhibitors formed by reacting guanidine-type compounds with polyamines.

U.S. Pat. No. 5,698,476 describes a laundry article containing a dye transfer inhibitor and dye absorber. The laundry article provides a support matrix for introducing the dye transfer inhibitor and dye absorber into the wash liquor.

The dye absorber maintains a relational association with the support matrix in the wash liquor, and the dye transfer inhibitor is released from the support matrix to the wash liquor.

U.S. patent application Ser. No. 09/146,873 describes functionalized polyamines which are used in detergent compositions as anti-dye transfer and color protection agents.

SUMMARY OF THE INVENTION

Accordingly, it is an object of the invention to provide an article for the convenient control of extraneous dyes and soil which may be present in wash liquor.

It is another object of the invention to provide an article for the convenient control of soil which may be present in wash liquor.

It is also an object of the invention to provide a laundry article that can prevent extraneous dyes present in a wash liquor from becoming redeposited onto other articles for which such redeposition is undesirable while simultaneously avoiding harmful interactions with other laundry auxiliaries as well as deleterious effects on non-extraneous dyes present on the articles.

With regard to the foregoing and other objects, the invention provides a laundry article effective for inhibiting transfer of extraneous dyes and soil to articles in a wash liquor, said laundry article comprising (I) a support matrix; and (II) a functionalized polyamine attached to or entrapped in the support matrix, wherein the support matrix contains from about 0.01 to about 50 weight percent of the functionalized polyamine, based on the weight of functionalized polyamine and support matrix, and the functionalized polyamine comprises the reaction product of (A) a cyano- or guanidino-containing compound selected from the group consisting of cyanamides or salts thereof, dicyanamides or salts thereof, dicyandiamides or salts thereof, guanidines or salts thereof, biguanidines or salts thereof, and combinations thereof, and (B) a polyamine prepared from at least one monomeric amine, wherein the cyano- or guanidino-functional groups are attached to the polyamine or incorporated therein to form the functionalized polyamine, provided that the monomeric amine and the cyano- or guanidino-containing compound are present in the functionalized polyamine in a molar ratio of from about 0.1:1 to about 10:1, respectively, wherein the functionalized polyamine has the structure $$H_2N—R_1\text{--}[\text{--}N(R_2)_qR_3\text{--}]_w\text{--}[\text{--}NH_2]_x$$

wherein $R_1$ is selected from the group consisting of $C_1$–$C_{20}$ alkyl, aryl, alkaryl, and --$(CH_2CHXO)_p$--; X is selected from the group consisting of hydrogen, methyl, ethyl, propyl, phenyl, OH, and OX'; X' is selected from the group consisting of $C_1$–$C_{20}$ alkyl, aryl, and alkaryl; $R_2$ is selected from the group consisting of hydrogen, $C_1$–$C_{20}$ alkyl, aryl, alkaryl, --$(CH_2CHXO)_p$--, —$R_7$--[--$N(R_8)_rR_9$--$]_y$--[--$NH_2]_z$, and —C═$NHY_1(NY_2Y_3)$--; $R_3$ is selected from the group consisting of hydrogen, $C_1$–$C_{20}$ alkyl, aryl, alkaryl, --$(CH_2CHXO)_p$--, —$R_4R_5N$—$R_6$--, $R_{13}$--[--$N(R_{14})_s$ $R_{15}$--$]_a$--[--$NH_2]_b$ and —C═$NHY_7(NY_8Y_9)$--; $R_4$ is selected from the group consisting of $C_1$–$C_4$ alkyl, alkoxy, and alkamine; $R_5$ is selected from the group consisting of $C_1$–$C_4$ alkyl, alkoxy, and alkamine; $R_6$ is selected from the group consisting of hydrogen, $C_1$–$C_{20}$ alkyl, aryl, alkaryl, and --$(CH_2CHXO)_p$--, and —C═$NHY_7(NY_8Y_9)$--; $R_7$ is selected from the group consisting of $C_1$–$C_{20}$ alkyl, aryl, alkaryl, and --$(CH_2CHXO)_p$--; $R_8$ is selected from the group consisting of hydrogen, $C_1$–$C_{20}$ alkyl, aryl, alkaryl, --$(CH_2CHXO)_p$--, and —C═NHY$_1$(NY$_2$Y$_3$)--; $R_9$ is selected from the group consisting of hydrogen, $C_1$–$C_{20}$ alkyl, aryl, alkaryl, --$(CH_2CHXO)_p$--, —$R_{10}R_{11}$N—$R_{12}$--, and —C═NHY$_7$(NY$_8$Y$_9$)--; $R_{10}$ is selected from the group consisting of $C_1$–$C_4$ alkyl, alkoxy, and alkamine; $R_{11}$ is selected from the group consisting of $C_1$–$C_4$ alkyl, alkoxy, and alkamine; $R_{12}$ is selected from the group consisting of hydrogen, $C_1$–$C_{20}$ alkyl, aryl, alkaryl, and --$(CH_2CHXO)_p$--, and —C═NHY$_7$(NY$_8$Y$_9$)--; $R_{13}$ is selected from the group consisting of $C_1$–$C_{20}$ alkyl, aryl, alkaryl, and --$(CH_2CHXO)_p$--; $R_{14}$ is selected from the group consisting of hydrogen, $C_1$–$C_{20}$ alkyl, aryl, alkaryl, --$(CH_2CHXO)_p$--, and —C═NHY$_1$(NY$_2$Y$_3$)--; $R_{13}$ is selected from the group consisting of hydrogen, $C_1$–$C_{20}$ alkyl, aryl, alkaryl, --$(CH_2CHXO)_p$--, —$R_{16}R_{17}$N—$R_{18}$--, and —C═NHY$_7$(NY$_8$Y$_9$)--; $R_{16}$ is selected from the group consisting of $C_1$–$C_4$ alkyl, alkoxy, and alkamine; $R_{17}$ is selected from the group consisting of $C_1$–$C_4$ alkyl, alkoxy, and alkamine; $R_{18}$ is selected from the group consisting of hydrogen, $C_1$–$C_{20}$ alkyl, aryl, alkaryl, and --$(CH_2CHXO)_p$--, and —C═NHY$_7$(NY$_8$Y$_9$)--; $Y_1$ is a dissociated acid; $Y_2$ is selected from the group consisting of hydrogen, $C_1$–$C_{20}$ alkyl, aryl, alkaryl, and --$(CH_2CHXO)_p$--; $Y_3$ is selected from the group consisting of hydrogen, $C_1$–$C_{20}$ alkyl, aryl, alkaryl, --$(CH_2CHXO)_p$--, —C═NHY$_4$(NY$_5$Y$_6$)--, and nitrile (—C:::N); $Y_4$ is a dissociated acid; $Y_5$ is selected from the group consisting of hydrogen, $C_1$–$C_{20}$ alkyl, aryl, alkaryl, and --$(CH_2CHXO)_p$--; $Y_6$ is selected from the group consisting of hydrogen, $C_1$–$C_{20}$ alkyl, aryl, alkaryl, and --$(CH_2CHXO)_p$--; $Y_7$ is a dissociated acid; $Y_8$ is selected from the group consisting of hydrogen, $C_1$–$C_{20}$ alkyl, aryl, alkaryl, and --$(CH_2CHXO)_p$--; $Y_9$ is selected from the group consisting of hydrogen, $C_1$–$C_{20}$ alkyl, aryl, alkaryl, --$(CH_2CHXO)_p$--, —C═NHY$_{10}$(NY$_{11}$Y$_{12}$)--, and nitrile (—C:::N); $Y_{10}$ is a dissociated acid; $Y_{11}$ is selected from the group consisting of hydrogen, $C_1$–$C_{20}$ alkyl, aryl, alkaryl, and --$(CH_2CHXO)_p$--; $Y_{12}$ is selected from the group consisting of hydrogen, $C_1$–$C_{20}$ alkyl, aryl, alkaryl, and --$(CH_2CHXO)_p$--; a is 1 to 5,000; b is 0 or 1; p is 1 to 6; q is 0 or 1; r is 0 or 1; s is 0 or 1; w is 1 to 5,000; x is 0 or 1; y is 1 to 5,000; z is 0 or 1; provided that when the functionalized polyamine is attached to the support matrix, a coupling agent is reacted with at least one amine group on the functionalized polyamine and at least one functional group present on the surface of the support matrix.

According to another aspect the invention provides a laundry article wherein the functionalized polyamine as described above is attached to the support matrix by means of covalent bonds.

The laundry article of the present invention inhibits dye transfer, soil redeposition, and provides color protection to fabrics in a wash liquor. In addition, the laundry article does not interfere with the removal of stains from fabrics washed in the presence of the laundry article. Furthermore, the laundry article containing the functionalized polyamines are economical and environmentally safe. Preferably the laundry article of the invention is used in conjunction with a detergent formulation.

DESCRIPTION OF THE INVENTION

This invention provides a novel laundry article effective for inhibiting transfer of extraneous dyes and soil to articles in a wash liquor. The laundry article comprises (I) a support matrix and (II) a functionalized polyamine which is attached to or entrapped in the support matrix. The laundry article may be used more than once in laundry wash liquors.

The support matrix which may be used in accordance with the present invention can be comprised of any type of natural or synthetic material with which the functionalized polyamine may either become attached thereto, preferably by means of covalent bonding, or entrapped therein. Further to its function as a carrier for the functionalized polyamine, the purpose of the support matrix is to provide a sufficient surface area upon which the functionalized polyamine is accessible to the bath or wash liquid in which the laundry article is to be used. Materials which may be suitable for support matrices of the present invention include cellulosic fibers (woven or nonwoven), non-cellulosic fibers (woven or nonwoven), zeolites, starches, modified starches, and combinations thereof. In the case of certain non-woven materials that do not exhibit good wash strength, it may be desirable to use auxiliaries, such as binders, to enhance the durability of the support matrix. Non-woven rayon is one such example of a material with low wash strength which may benefit from the addition of binders.

It has been determined that cellulosics such as wood pulp, rayon and cotton are especially effective substances to be used as support matrices, besides having the additional advantage that they are available at relatively low cost. It has further been determined that acetates are also suitable, especially monoacetates. Synthetic polymeric materials such as polyester, polyethylene and polypropylene may be used as support matrices alone or in combination with other support matrices as additives to improve fabric wash strength under standard washing conditions.

Other factors that are important in selecting a suitable support matrix include such considerations as durability, handfeel, processability and cost. The laundry article should not lint, excessively tear or fall apart during the wash process.

The form in which the support matrix may be found for purposes of the present invention is virtually limitless. In one relatively simple embodiment according to the present invention, the support matrix may consist of a fiber or filament. The functionalized polyamine may be covalently bonded to the fiber or filament by means of a linking group or coupling agent. The fiber or filament may subsequently be incorporated in woven or non-woven form to generate a sheet. Other forms for the support matrix which are consistent with the laundry article of the present invention include such configurations as fiber balls or beads or other forms of intercalation supports in addition to the more conventional sheet form. Ultimately, any article or object that can conveniently be retrieved from a wash load, either after washing or after drying would be appropriate as a support matrix.

The support matrix contains from about 0.01 to about 50 weight percent of functionalized polyamine, based on the total weight of the functionalized polyamine and support matrix. Preferably, the functionalized polyamine is present in the support matrix in an amount of from about 1 to about 20 weight percent, more preferably from about 5 to 15 weight percent.

When the functionalized polyamine is attached to the support matrix, a coupling agent is reacted with at least one amine group on the functionalized polyamine and at least one functional group present on the surface of the support matrix. The coupling agent may be any linking group which is used in reactive dye chemistry to bind a reactive dye to a cellulosic substrate. Suitable coupling agents include formaldehyde, trichloropyrimidine, monochlorotriazine, vinyl sulfones, monofluorotriazine, difluorochloropyrimidine, dichlorotriazine, and dialkyl urea wherein the alkyl group has 1 to 20 carbon atoms, such as diethanol urea. Examples of suitable functional groups which may be present on the surface of the support matrix are moieties such as hydroxyl, acetyl and carboxyl groups, as well as derivatized species thereof such as acetates, amines, and so forth.

In the alternative, the functionalized polyamine may be entrapped in the support matrix. As used herein, "entrapped" refers to the substantially complete penetration of the functionalized polyamine into and throughout the support matrix, and to the distribution of the functionalized polyamine in a preferably substantially uniform manner in the support matrix.

The functionalized polyamine comprises the reaction product of (A) a cyano- or guanidino-containing compound selected from the group consisting of cyanamides or salts thereof, dicyanamides or salts thereof, dicyandiamides or salts thereof, guanidines or salts thereof, biguanidines or salts thereof, and combinations thereof, and (B) a polyamine prepared from at least one monomeric amine, wherein the cyano- or guanidino-functional groups are attached to the polyamine or incorporated therein to form the functionalized polyamine.

The monomeric amine and the cyano- or guanidino-containing compound are present in the functionalized polyamine in a molar ratio of from about 0.1:1 to about 10:1 respectively. Preferably, the molar ratio of the monomeric amine and the cyano- or guanidino-containing compound is from about 0.3:1 to about 3:1, more preferably from about 0.8:1 to 1.2:1. The backbone of the functionalized polyamine can be linear or cyclic and may contain functionalized polyamine branching chains which also may be linear or cyclic and which may contain branching units, etc. Preferably the backbone of the functionalized polyamine is linear with alternating amine and cyano- or guanidino-repeating units.

The functionalized polyamine has the structure $$H_2N—R_1\text{--}[\text{--}N(R_2)_qR_3]_w\text{--}[\text{--}NH_2]_x$$

wherein $R_1$ is selected from the group consisting of $C_1$–$C_{20}$ alkyl, aryl, alkaryl, and --$(CH_2CHXO)_p$--. Preferably $R_1$ is a hexamethylene or 2-methyl-pentamethylene group. X is selected from the group consisting of hydrogen, methyl, ethyl, propyl, phenyl, OH, and OX'. X' is selected from the group consisting of $C_1$–$C_{20}$ alkyl, aryl, and alkaryl. $R_2$ is selected from the group consisting of hydrogen, $C_1$–$C_{20}$ alkyl, aryl, alkaryl, --$(CH_2CHXO)_p$--, —$R_7$--[--$N(R_8)_rR_9$ --]$_y$--[--$NH_2$]$_z$, and —C═$NHY_1(NY_2Y_3)$--. Preferably $R_2$ is selected from hydrogen, hexamethylene or 2-methyl-pentamethylene group. $R_3$ is selected from the group consisting of hydrogen, $C_1$–$C_{20}$ alkyl, aryl, alkaryl, --$(CH_2CHXO)_p$--, —$R_4R_5N$—$R_6$--, $R_{13}$--[--$N(R_{14})_s$ $R_{15}$--]$_a$--[--$NH_2$]$_b$ and —C═$NHY_7(NY_8Y_9)$--. Preferably $R_3$ is a hexamethylene or 2-methyl-pentamethylene group. $R_4$ is selected from the group consisting of $C_1$–$C_4$ alkyl, alkoxy, and alkamine. Preferably $R_4$ is a ethyl, dimethylamino or dimethyloxy group. $R_5$ is selected from the group consisting of $C_1$–$C_4$ alkyl, alkoxy, and alkamine. Preferably $R_5$ is a ethyl, dimethylamino or dimethyloxy group. $R_6$ is selected from the group consisting of hydrogen, $C_1$–$C_{20}$ alkyl, aryl, alkaryl, and --$(CH_2CHXO)_p$--, and —C═$NHY_7$ $(NY_8Y_9)$--. Preferably $R_6$ is a hexamethylene, 2-methyl-pentamethylene, or biguanidine group. $R_7$ is selected from the group consisting of $C_1$–$C_{20}$ alkyl, aryl, alkaryl, and --$(CH_2CHXO)_p$--. Preferably $R_7$ is a hexamethylene or 2-methyl-pentamethylene group. $R_8$ is selected from the group consisting of hydrogen, $C_1$–$C_{20}$ alkyl, aryl, alkaryl, --$(CH_2CHXO)_p$--, and —C═$NHY_1(NY_2Y_3)$--. Preferably $R_8$ is selected from a hydrogen, hexamethylene, 2-methyl-pentamethylene, or biguanidine group. $R_9$ is selected from the group consisting of hydrogen, $C_1$–$C_{20}$ alkyl, aryl, alkaryl, --$(CH_2CHXO)_p$--, —$R_{10}R_{11}N$—$R_{12}$--, and —C═$NHY_7(NY_8Y_9)$--. Preferably $R_9$ is a hydrogen, hexamethylene, 2-methyl-pentamethylene, or biguanidine group.

$R_{10}$ is selected from the group consisting of $C_1$–$C_4$ alkyl, alkoxy, and alkamine. Preferably $R_{10}$ is a ethyl, dimethylamino or dimethyloxy group. $R_{11}$ is selected from the group consisting of $C_1$–$C_4$ alkyl, alkoxy, and alkamine. Preferably $R_{11}$ is a ethyl, dimethylamino or dimethyloxy group. $R_{12}$ is selected from the group consisting of hydrogen, $C_1$–$C_{20}$ alkyl, aryl, alkaryl, and --$(CH_2CHXO)_p$--, and —C═$NHY_7$ $(NY_8Y_9)$--. Preferably $R_{12}$ is a hexamethylene, 2-methyl-pentamethylene, or biguanidine group. $R_{13}$ is selected from the group consisting of $C_1$–$C_{20}$ alkyl, aryl, alkaryl, and --$(CH_2CHXO)_p$--. Preferably $R_{13}$ is a hexamethylene or 2-methyl-pentamethylene group. $R_{14}$ is selected from the group consisting of hydrogen, $C_1$–$C_{20}$ alkyl, aryl, alkaryl, --$(CH_2CHXO)_p$--, and —C═$NHY_1(NY_2Y_3)$--. Preferably $R_{14}$ is selected from a hydrogen, hexamethylene, 2-methyl-pentamethylene, or biguanidine group. $R_{15}$ is selected from the group consisting of hydrogen, $C_1$–$C_{20}$ alkyl, aryl, alkaryl, --$(CH_2CHXO)_p$--, —$R_{16}R_{17}N$—$R_{18}$--, and —C═$NHY_7(NY_8Y_9)$--. Preferably $R_{15}$ is a hexamethylene, 2-methyl-pentamethylene, or biguanidine group.

$R_{16}$ is selected from the group consisting of $C_1$–$C_4$ alkyl, alkoxy, and alkamine. Preferably $R_{16}$ is a ethyl, dimethylamino or dimethyloxy group. $R_{17}$ is selected from the group consisting of $C_1$–$C_4$ alkyl, alkoxy, and alkamine. Preferably $R_{17}$ is a ethyl, dimethylamino or dimethyloxy group. $R_{18}$ is selected from the group consisting of hydrogen, $C_1$–$C_{20}$ alkyl, aryl, alkaryl, and --$(CH_2CHXO)_p$--, and —C═$NHY_7$ $(NY_8Y_9)$--. Preferably $R_{18}$ is a hexamethylene, 2-methyl-pentamethylene, or biguanidine group.

$Y_1$ is a dissociated acid. $Y_2$ is selected from the group consisting of hydrogen, $C_1$–$C_{20}$ alkyl, aryl, alkaryl, and --$(CH_2CHXO)_p$--. $Y_3$ is selected from the group consisting of hydrogen, $C_1$–$C_{20}$ alkyl, aryl, alkaryl, --$(CH_2CHXO)_p$--, —C═$NHY_4(NY_5Y_6)$--, and nitrile (—C:::N). $Y_4$ is a dissociated acid. $Y_5$ is selected from the group consisting of hydrogen, $C_1$–$C_{20}$ alkyl, aryl, alkaryl, and --$(CH_2CHXO)_p$--. $Y_6$ is selected from the group consisting of hydrogen, $C_1$–$C_{20}$ alkyl, aryl, alkaryl, and --$(CH_2CHXO)_p$--. $Y_7$ is a dissociated acid. $Y_8$ is selected from the group consisting of hydrogen, $C_1$–$C_{20}$ alkyl, aryl, alkaryl, and --$(CH_2CHXO)_p$--. $Y_9$ is selected from the group consisting of hydrogen, $C_1$–$C_{20}$ alkyl, aryl, alkaryl, --$(CH_2CHXO)_p$--, —C═$NHY_{10}$ $(NY_{11}Y_{12})$--, and nitrile (—C:::N). $Y_{10}$ is a dissociated acid. $Y_{11}$ is selected from the group consisting of hydrogen, $C_1$–$C_{20}$ alkyl, aryl, alkaryl, and --$(CH_2CHXO)_p$--. $Y_{12}$ is selected from the group consisting of hydrogen, $C_1$–$C_{20}$ alkyl, aryl, alkaryl, and --$(CH_2CHXO)_p$--. As used herein, the "acid" in the definitions for $Y_1$, $Y_4$, $Y_7$, and $Y_{10}$ may be any weak or strong monatomic or polyatomic inorganic or organic acid such as hydrochloric acid or sulfuric acid.

In the above structure for the polyamine, the letter a is from 1 to 5,000, preferably from about 2 to about 100, most preferably from about 5 to about 20. The letter b is 0 or 1. The letter p is from 1 to 6, preferably from 2 to 4. The letter q is 0 or 1. The letter r is 0 or 1. The letter s is 0 or 1. The letter w is from 1 to 5,000, preferably from about 2 to about 100, most preferably from about 5 to about 20. The letter x is 0 or 1. The letter y is from 1 to 5,000, preferably from about 2 to about 100, most preferably from about 5 to about 20. The letter z is 0 or 1.

Specific examples of cyano- or guanidino-containing compounds for use in preparing the functionalized polyamine of the invention are sodium dicyanamide, dicyandiamide, guanidine, biguanidine, dimethylguanidine, sodium cyanamide, and combinations thereof. A combination of cyano- or guanidino-containing compounds may also be used to prepare the functionalized polyamine. Preferably, the cyano- or guanidino-containing compound is sodium dicyanamide or dicyandiamide.

The polyamine (B) is prepared from at least one monomeric amine. Suitable monomeric amines include alkyleneamines, cycloalkyleneamines, arylamines, alkylenearylamines, and alkoxylatedamines. Examples of alkyleneamines include hexamethylenediamine, 2-methylpentamethylenediamine, ethylenediamine, 1,4-diaminobutane, 1,8-diaminooctane, 1,2-diamino-2-methylpropane, diethylenetriamine, triethylenetetraamine, tetraethylenepentaamine, pentaethylenehexaamine, propylenediamine, dipropylenetriamine, and tripropylene tetramine. Examples of cycloalkyleneamines include aziridine, piperazine, and diaminocyclohexane. Examples of arlyamines include diaminobenzene, aminopyridine, and pyrazine. Examples of alkylenearly amines include aminoethylaniline, aminopropylaniline, aminoethylpyridine. Examples of alkoxylatedamines include 2-(2-aminoethylamino)ethanol and 2,2'-oxybis(ethylamine) dihydrochloride. Combinations of the above monomeric amines may also be used. Preferably the polyamine (B) is prepared from a monomeric amine which is selected from the group consisting of hexamethylenediamine, 2-methylpentamethylenediamine, aziridine, ethylenediamine, 1,4-diaminobutane, 1,8-diaminooctane, 1,2-diamino-2-methylpropane, diethylenetriamine, triethylenetetraamine, tetraethylenepentaamine, pentaethylenehexaamine, piperazine, 2-(2-aminoethylamino)ethanol, 2,2'-oxybis (ethylamine)dihydrochloride, propylenediamine, dipropylenetriamine, and tripropylene tetramine. Most preferably the polyamine (B) is prepared from hexamethylenediamine and/or 2-methylpentamethylene diamine.

The cyano- or guanidino-functional groups on the cyano- or guanidino-containing compound (A) are attached to the polyamine (B) to form the functionalized polyamine of the invention. It is within the scope of the invention that the functionalized polyamine may contain unmodified amine groups. The unmodified amine groups may be oxidized to form amine-N-oxides. Alternately, or in addition to, the unmodified amine groups on the functionalized polyamine may be ethoxylated, and/or quaternized. While not wishing to be bound by any particular theory, the inventors believe that the cyano- or guanidino-containing compounds are attached to the backbone of the polyamine by means of covalent bonds formed by an addition reaction between either the primary, secondary and/or tertiary amines on the polyamine and an imine and/or nitrile group on the cyano- or guanidino-containing compound resulting in an "iminoamine" or amidine (FIG. 1) linkage which may be substituted or unsubstituted.

FIG.1

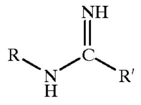

In a most preferred embodiment of the invention, the functionalized polyamine is the reaction product of sodium dicyanamide and a polyamine prepared from hexamethylene diamine, wherein the functionalized polyamine has the structure:

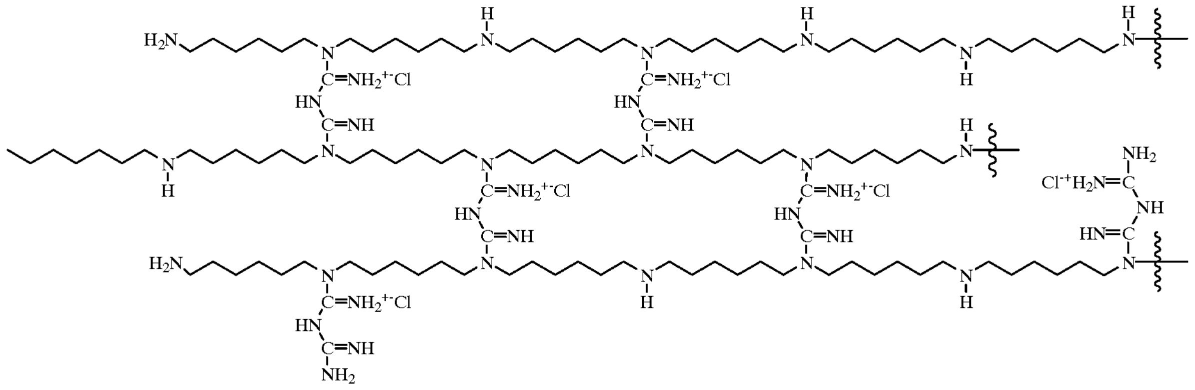

In a first preferred embodiment of the invention, the functionalized polyamine has a linear backbone which is represented by the following structure:

$$H_2N—R_1\text{--}[\text{--}N(R_2)_qR_3\text{--}]_w\text{--}[\text{--}NH_2]_x$$

wherein $R_2$ is hydrogen; $R_3$ is selected from the group consisting of hydrogen, $C_1$14 $C_{20}$ alkyl, aryl, alkaryl, $\text{--}(CH_2CHXO)_p\text{--}$, $—R_4R_5N—R_6\text{--}$, $R_{13}\text{--}[\text{--}N(R_{14})_s R_{15}\text{--}]_a\text{--}[\text{--}NH_2]_b$ and $—C{=}NHY_7(NY_8Y_9)\text{--}$. More preferably, $R_1$ and $R_3$ are independently hexamethylene, 2-methylpentamethylene, or biguanidine groups, with the majority of the groups being hexamethylene and 2-methylpentamethylene. $R_2$ is hydrogen, q is 1, and w is from about 2 to about 100.

In a second preferred embodiment of the invention, the functionalized polyamine has a linear backbone which incorporates cyclic and acyclic moieties and is represented by the following structure:

$$H_2N—R_1\text{--}[\text{--}N(R_2)_qR_3\text{--}]_w\text{--}[\text{--}NH_2]_x$$

wherein the cyclic moiety of the functionalized polyamine is defined when q is 0; $R_3$ is —$R_4R_5N$—$R_6$--, provided that if $R_6$ is hydrogen, then x is 0; and the acyclic moiety of the functionalized polyamine is defined when q is 1; $R_2$ is hydrogen; and $R_3$ is selected from the group consisting of hydrogen, $C_1$–$C_{20}$ alkyl, aryl, alkaryl, --$(CH_2CHXO)_p$--, and —C═$NHY_7(NY_8Y_9)$--, providing that if $R_2$ and $R_3$ are hydrogen, then x is 0; if $Y_8$ and $Y_9$ are hydrogen, then x is 0; if $Y_{11}$ and $Y_{12}$ are hydrogen, then x is 0. More preferably, $R_4$ and $R_5$ are ethylene, $R_1$, $R_3$, and $R_6$ are independently hexamethylene, 2-methylpentamethylene, or biguanidine groups, with the majority of the groups being hexamethylene and/or 2-methylpentamethylene; w is from about 2 to about 100.

In a third preferred embodiment of the invention, the functionalized polyamine is multiply branched and is represented by the following structure:

$$H_2N—R_1\text{--}[\text{--}N(R_2)_qR_3\text{--}]_w\text{--}[\text{--}NH_2]_x$$

wherein $R_2$ is selected from the group consisting of $C_1$–$C_{20}$ alkyl, aryl, alkaryl, --$(CH_2CHXO)_p$--, —$R_7$--[--$N(R_8)_r$ $R_9$--$]_y$--[--$NH_2]_z$, and —C═$NHY_1(NY_2Y_3)$--; $R_3$ is selected from the group consisting of $C_1$–$C_{20}$ alkyl, aryl, alkaryl, --$(CH_2CHXO)_p$--, —$R_4R_5N$—$R_6$--, $R_{13}$--[--$N(R_{14})_s$ $R_{15}$--$]_a$--[--$NH_2]_b$ and —C═$NHY_7(NY_8Y_9)$--, and q is 1. It is within the scope of the invention that the functionalized polyamine may comprise further branching or higher degrees of branching which have not been depicted.

In a preferred functionalized polyamine branched structure, $R_1$, $R_2$, $R_3$, $R_7$, and $R_{13}$ are independently hexamethylene or 2-methylpentamethylene; $R_8$ and $R_{14}$, if present, are independently selected from the group consisting of hydrogen, hexamethylene and 2-methylpentamethylene; $R_9$ is selected from the group consisting of hexamethylene, 2-methylpentamethylene, and —$R_{10}R_{11}N$—$R_{12}$--; $R_{10}$ is ethylene; $R_{11}$ is ethylene; $R_{12}$ is selected from the group consisting of hydrogen, hexamethylene and 2-methylpentamethylene; $R_{15}$ is selected from the group consisting of hexamethylene, 2-methylpentamethylene, and —$R_{16}R_{17}N$—$R_{18}$--; $R_{16}$ is ethylene; $R_{17}$ is ethylene; $R_{18}$ is selected from the group consisting of hydrogen, hexamethylene and 2-methylpentamethylene; a is from about 2 to about 100; x is 1; y is from about 2 to about 100; and w is from about 2 to about 100.

The functionalized polyamines of the invention comprise modified homogeneous and non-homogeneous polyamine backbones, wherein 100% or less of the —NH units are modified. As used herein, "homogeneous polyamine backbone" means a polyamine backbone having multiple occurrences of the same repeating unit (i.e., all hexamethylene). However, "homogeneous polyamine backbone" does not exclude polyamines that comprise other extraneous units comprising the polyamine backbone which are present as a consequence of the chosen method of chemical synthesis. For example, ethanolamine may be used as an "initiator" in the synthesis of polyethyleneimines, therefore, a sample of polyethyleneimine that comprises one hydroxyethyl moiety resulting from the polymerization "initiator" would be considered to comprise a homogeneous polyamine backbone for the purposes of the invention.

As used herein, "non-homogeneous polyamine backbone" means polyamine backbones that are a composite of structurally varied repeating units. For example, a non-homogeneous polyamine backbone comprises multiple units that are a mixture of hexamethylene and 2-methylpentamethylene units. The proper manipulation of the various repeating units which determine the overall structure provides the formulator with the ability to modify the formulation compatibility, color protection and anti-dye transfer properties of the functionalized polyamines of the invention.

The relative proportions of primary, secondary, and tertiary amine units in the polyamine backbone will vary depending on the manner of preparation. Each hydrogen atom attached to each nitrogen atom of the polyamine backbone chain represents a potential site for subsequent substitution of the cyano- or guanidino-containing compounds. Preferred functionalized polyamines of the invention comprise homogeneous polyamine backbones that are totally or partially substituted by the cyano- or guanidino-containing compounds.

The functionalized polyamines are prepared by means of a polymerization reaction, preferably in water. The polymerization may be conducted in the presence of an inorganic acid and/or an organic acid. Salts of the inorganic acid and/or organic acid may also be included in the polymerization. Suitable inorganic acids are hydrochloric acid and sulfuric acid. Suitable organic acids are acetic acid. The inorganic acid and organic acid may, for example, be added to the polymerization to neutralize the amine functionality.

Although the reaction proceeds without a catalyst, a catalyst may be employed to speed up the reaction. Suitable catalysts are known to those skilled in the art.

In general, the temperature of polymerization will vary with the particular reactants, catalysts, etc. In general, the reaction is carried out from about 75° C. to 200° C., preferably from 100° C. to 180° C., more preferably from 120° C. to 170° C. Optimum temperatures will vary with the particular system.

The process of the invention is conveniently carried out in the course of a laundering or washing process. The laundering or washing process is preferably carried out at about 5° C. to about 75° C., more preferably, from about 20° C. to about 60° C., but the functionalized polyamines are effective at up to about 100° C.

The following nonlimiting examples illustrate further aspects of the invention.

EXAMPLE 1

Formation Of A 1:1 Biguanide-Formaldehyde Adduct.

A clean, dry 100 mL flask was charged with 1.50 g (0.050 mol) of paraformaldehyde, 50.0 g (0.050 mol) of 20% aqueous VANTOCIL IB available from Zeneca and a large stir bar. The initial mixture was opaque white upon stirring. The paraformaldehyde does not initially dissolve. The contents were stirred and heated at 60–70° C. for three hours. The final product was a water-thin solution that appeared slightly opaque and colorless.

EXAMPLE 2

Formation Of A 1:2.5 Biguanide-Formaldehyde Adduct.

A clean, dry 100 mL flask was charged with 4.0 g (0.13 mol) of paraformaldehyde, 50.0 g (0.050 mol) of 20% aqueous VANTOCIL IB, and a large stir bar. The initial mixture was opaque white upon stirring. The paraformaldehyde does not initially dissolve. The contents were stirred and heated at 60–70° C. for three hours. The final product was a water-thin solution that appeared slightly opaque and colorless.

EXAMPLE 3

Formation Of A Biguanide-Urea Adduct.

A clean, dry 250 mL flask was charged with 6.30 g (0.050 mol) of diethylol urea, 50 g (0.050 mol) of 20% aqueous VANTOCIL IB and a large stir bar. The contents were stirred and heated at 60–70° C. for three hours. The final product was a water-thin solution that appeared slightly opaque and colorless.

EXAMPLE 4

Scaled Formation Of A Biguanide-Formaldehyde Adduct Using 30% VANTOCIL IB.

A clean, dry 500 mL flask was charged with 7.50 g (0.25 mol) of paraformaldehyde, 167 g (0.25 mol) of 30% aqueous VANTOCIL IB and a large stir bar. The initial mixture was opaque white upon stirring. The paraformaldehyde does not initially dissolve. The contents were stirred and heated at 60–70° C. for two hours, after which the reaction appeared slightly opaque, colorless, and moderately viscous. 83.3 g of water was added to the flask, and the reaction was then heated at 85° C. for two additional hours with stirring. The final product was a water-thin solution that appeared slightly opaque and colorless.

EXAMPLE 5

Coupling Of A 1:1 Biguanide-Formadehyde Adduct With Cotton Cloth Swatches.

A clean, dry 250 mL flask was charged with the product solution from Example 1 and a cloth swatch approximately 4.5"x6" (~0.5 g) and cut into four equal pieces. The mixture was heated with stirring at 95–100° C. for 2.0 hours. The swatches were then removed from the reaction mixture and rinsed by stirring in 200 mL of city water for 50 minutes. After rinsing, the swatches were air-dried overnight before being submitted for testing.

EXAMPLE 6

Coupling Of A 1:2.5 Biguanide-Formadehyde Adduct With Cotton Cloth Swatches.

A clean, dry 250 mL flask was charged with the product solution from Example 2, 50 mL of water, 2.0 g (0.01 mol) of $MgCl_2.6H_2O$, and a COTTON 400 swatch from Test Fabrics approximately 4.5"x 6" (~0.5 g) and cut into four equal pieces. The mixture was heated with stirring at 95–100° C. for 2.0 hours. The swatches were then removed from the reaction mixture and rinsed by stirring in 200 mL of city water for 50 minutes. After rinsing, the swatches were air-dried overnight before being tested.

EXAMPLE 7

Coupling Of A Biguanide-Urea Adduct With Cotton Cloth Swatches.

A clean, dry 250 mL flask was charged with the product solution from Example 3 and a cloth swatch approximately 4.5"x 6" (~0.5 g) and cut into four equal pieces. The mixture was heated with stirring at 95–100° C. for 5.0 hours. The swatches were then removed from the reaction mixture and rinsed by stirring in 200 mL of city water for 50 minutes. After rinsing, the swatches were air-dried overnight before being submitted for testing.

EXAMPLE 8

Coupling Of Biguanide-Formadehyde Adduct With VULCA 90 Starch Available From National Starch And Chemical Company (1:1 Weight Basis).

A clean, dry 250 mL flask was charged with 90.5 g of the product solution from Example 4 and 11.31 g Vulca 90 starch. The mixture was heated with stirring at 95–100° C. for 2.0 hours. The reaction was then cooled, filtered through a Buchner funnel, washed with 325 mL of deionized water, and air-dried overnight.

EXAMPLE 9

Coupling Of Biguanide-Formadehyde Adduct With ABSORBO HP Starch Available From National Starch And Chemical Company (1:1 Weight Basis).

A clean, dry 250 mL flask was charged with 90.5 g of the product solution from Example 4 and 11.31 g Absorbo HP starch. The mixture was heated with stirring at 95–100° C. for 2.5 hours. The reaction was then cooled, filtered through a Buchner funnel, washed with 525 mL of deionized water, and air-dried overnight.

EXAMPLE 10

Coupling Of Biguanide-Formadehyde Adduct With Purity 21 starch (1:1 Weight Basis).

A clean, dry 250 mL flask was charged with 90.5 g of the product solution from Example 4 and 11.31 g Purity 21 starch. The mixture was heated with stirring at 95–100° C. for two hours. The resulting product was too viscous for filtration, and was dried in an oven overnight to remove water.

EXAMPLE 11

Direct Coupling Of A Biguanide Polymer With A Cotton Swatch Using A Urea.

A clean dry drying glass was charged with a 4.5"x6" cotton swatch (0.4325 g), 12.75 g (0.013 mol) of 20% aqueous VANTOCIL IB, and 1.575 g (0.013 mol) of diethylol urea. The mixture was heated in an analytical oven at 140–150° C. until all water was removed as measured by weight difference. Drying time was approximately 2.0 hours. The cloth weighed 0.50 g after drying.

EXAMPLE 12

Coupling Of Biguanide-Formadehyde Adduct With Vulca 90 Starch (2:1 Molar Basis).

A clean, dry 100 mL flask was charged with 25.0 g of the product solution from Example 4 and 2.41 g Vulca 90 starch. The mixture was heated with stirring at 95–100° C. for 2.5 hours. The reaction was then cooled, filtered through a Buchner funnel, washed with 100 mL of deionized water, and air-dried.

EXAMPLE 13

Coupling Of Biguanide-Formadehyde Adduct With Vulca 90 Starch (4:1 Molar Basis).

A clean, dry 100 mL flask was charged with 25.0 g of the product solution from Example 4 and 1.20 g Vulca 90 starch. The mixture was heated with stirring at 95–100° C. for 2.5 hours. The reaction was then cooled, filtered through a Buchner funnel, washed with 100 mL of deionized water, and air-dried.

EXAMPLE 14

Coupling Of Biguanide-Formadehyde Adduct With Absorbo HP Starch (2:1 Molar Basis).

A clean, dry 100 mL flask was charged with 25.0 g of the product solution from Example 4 and 2.41 g Vulca 90 starch. The mixture was heated with stirring at 95–100° C. for 2.5 hours. The reaction was then cooled, filtered through a Buchner funnel, washed with 100 mL of deionized water, and air-dried.

EXAMPLE 15

Coupling Of A Biguanide-Formadehyde Adduct With Cellulose (Wood Pulp) Nonwoven Sheet.

A clean, dry 500 mL flask was charged with 120.0 g of the product solution from Example 4, 100.0 g of deionized water, and eight swatches of cellulosic nonwoven sheet measuring approximately 4.5"x 6" (~0.5 g) each. The mixture was heated with stirring at 95–100° C. for 2.0 hours. The swatches were then removed from the reaction mixture and rinsed by stirring in 250 mL of city water for 2.0 hours. After rinsing, the swatches were air-dried prior to being submitted for testing.

EXAMPLE 16

Scaled Formation Of A Biguanide-Formaldehyde Adduct Using 20% VANTOCIL IB.

A clean, dry 2000 mL flask was charged with 66.2 g (2.21 mol) of paraformaldehyde, 2.2 g (2.41 mol) of 20% aqueous VANTOCIL IB. The initial mixture was opaque white upon stirring. The paraformaldehyde does not initially dissolve. The contents were stirred and heated at 60–70° C. for 3.5 hours. The final product was a water-thin solution that appeared slightly opaque and colorless.

EXAMPLE 17

Coupling Of Biguanide-Formadehyde Adduct With ZEOLEX 7 Zeolite Available From J.M. Huber Company (2:1 Weight Basis).

In a 2000 mL flask, the product solution from Example 16 was combined with 250.0 g of ZEOLEX 7 zeolite. The mixture was heated with stirring at 95–100° C. for 4.0 hours. The reaction was then cooled and filtered through a Buchner funnel in smaller portions with deionized water washes. The product filter cakes were then combined and air-dried on a large tray. The final product was an off-white powder.

EXAMPLE 18

Coupling Of Biguanide-Formadehyde Adduct With ZEOLEX 23-A Zeolite Available From J.M. Huber Company (2:1 Weight Basis).

In a 2000 mL flask, the product solution from Example 16 was combined with 250.0 g of ZEOLEX 23-A zeolite. The mixture was heated with stirring at 95–100° C. for 4.0 hours. The reaction was then cooled and filtered through a Buchner funnel in smaller portions with deionized water washes. The product filter cakes were then combined and air-dried on a large tray. The final product was an off-white powder.

EXAMPLE 19

Use Of The Treated Swatches Of Example 5 As A Dye Magnet.

A dye transfer test was conducted using the swatches treated as described in Example 5. The test was conducted in a terg-o-tometer at 93° F. using 2.0 g/l of Ajax powder (obtained from Colgate-Palmolive Co.) and 80 rpm. The wash cycle was 20 minutes and the rinse cycle was 3 minutes. A 150 ppm hardness solution containing a Ca to Mg ratio of 2:1 was used in both the wash and the rinse cycles. The wash load consisted of 4 swatches (4.5x6.0") of Direct Blue 1 and 2 white cotton 400 swatches (4.5x6.0") to receive the dye from the wash solution. The swatch treated in example 5 was cut in to 4 equal pieces and 3 of these treated swatches were used in the test. A control was run by using 3 untreated white swatches. The test results are summarized in Table I.

TABLE I

Dye transfer data using the swatches treated in Example 5.

| Dye Magnet | L value of white swatch | L value of Direct Blue 1 swatch | L value of treated (dye magnet swatch) |
|---|---|---|---|
| None | 73.96 | 39.6 | 74.1 |
| Dye magnet swatches of Example 5 | 78.0 | 38.9 | 61.5 |

The data in Table I indicates that the treated swatch grabs dye since its L value is smaller than that of the control which implies that it is darker than the control. As a result the white swatches used in the presence of the dirt magnet are lighter (higher L values) indicating that it has absorbed less dye and is protected by the treated swatches.

EXAMPLE 20

Use Of The Treated Swatches Of Example 6 As A Dye Magnet.

A dye transfer test was conducted using the swatches treated as described in Example 6. The test was conducted in a terg-o-tometer at 93° F. using 2.0 g/l of Ajax powder (obtained from Colgate-Palmolive Co.) and 80 rpm. The wash cycle was 20 minutes and the rinse cycle was 3 minutes. A 150 ppm hardness soltuion containing a Ca to Mg ratio of 2:1 was used in both the wash and the rinse cycles. The wash load consisted of 4 swatches (4.5x6.0") of Direct Blue 1 and 2 white cotton 400 swatches (4.5x6.0") to receive the dye from the wash solution. The swatch treated in example 5 was cut in to 4 equal pieces and 3 of these treated swatches were used in the test. A control was run by using 3 untreated white swatches. The test results are summarized in Table II.

TABLE II

Dye transfer data using the swatches treated in Example 5.

| Dye Magnet | L value of white swatch | L value of Direct Blue 1 swatch | L value of treated (dye magnet swatch) |
|---|---|---|---|
| None | 74.7 | 39.8 | 74.5 |
| Dye magnet swatches of Example 6 | 78.0 | 38.8 | 72.2 |

The data in Table II indicates that the treated swatch grabs dye since its L value is smaller than that of the control which implies that it is darker than the control. As a result the white swatches used in the presence of the dirt magnet are lighter (higher L values) indicating that it has absorbed less dye and is protected by the treated swatches.

EXAMPLE 21

Use Of The Treated Starches Of Example 8 and 9 As A Dye Magnet.

A dye transfer test was conducted using the swatches treated as described in Example 6. The test was conducted in a terg-o-tometer at 93° F. using 1.9 g/l of Ajax powder (obtained from Colgate-Palmolive Co.) and 80 rpm. The wash cycle was 20 minutes and the rinse cycle was 3 minutes. A 110 ppm hardness soltuion containing a Ca to Mg ratio of 2:1 was used in both the wash and the rinse cycles. The wash load consisted of 4 swatches (4.5x6.0") of Direct Blue 1, 4 swatches (4.5x6.0") of Direct Blue 90 and 1 white cotton 400 swatch (4.5x6.0") to receive the dye from the wash solution. The dye magnets were 1.0 gram of the starches synthesized in Examples 8 and 9. The test results are summarized in Table III.

TABLE III

Dye transfer data using the starches of Examples 8 and 9.

| Dye Magnet | L value of white swatch | L value of Direct Blue 1 swatch |
|---|---|---|
| None | 72.5 | 39.2 |
| Treated starch of Example 8 | 78.1 | 40.8 |
| Treated starch of Example 9 | 78.2 | 40.6 |

The data in Table III indicates that the modified starches of Example 8 and 9 grab dyes since, the white swatch used in the presence of these starches are lighter (higher L values) than the control indicating that it has absorbed less dye and is protected by the modified starches.

EXAMPLE 22

Use Of The Treated Starches Of Example 12, 13 And 14 As A Dye Magnet.

A dye transfer test was conducted using the treated starches of Example 12, 13 and 14 as a dye magnet. The test was conducted in a terg-o-tometer at 93° F. using 1.9 g/l of Greencare and 80 rpm. The wash cycle was 20 minutes and the rinse cycle was 3 minutes. A 110 ppm hardness soltuion containing a Ca to Mg ratio of 2:1 was used in both the wash and the rinse cycles. The wash load consisted of 4 swatches (4.5x6.0") of Direct Blue 1, 4 swatches (4.5x6.0") of Direct Blue 90 and 1 white cotton 400 swatch (4.5x6.0") to receive the dye from the wash solution. The dye magnets were various amounts of the starches synthesized in Examples 12 and 13. The test results are summarized in Table IV.

TABLE IV

Dye transfer data using the starches of Examples 12, 13 and 14.

| Dye Magnet | L value of white swatch | L value of Direct Blue 1 swatch |
|---|---|---|
| None | 73.6 | 40.4 |
| 2.1 gram of Example 12 | 81.5 | 40.2 |
| 1.1 gram of Example 13 | 81.2 | 40.3 |
| 1.0 gram of Example 14 | 81.4 | 40.6 |

The data in Table IV indicates that the modified starches of Example 12, 13 and 14 grab dyes since, the white swatch used in the presence of these starches are lighter (higher L values) than the control indicating that it has absorbed less dye and is protected by the modified starches.

EXAMPLE 23

Use Of The Treated Non Wovens Of Example 15 As A Dye Magnet.

A dye transfer test was conducted using the treated cellulosic non woven of Example 15 as a dye magnet. The test was conducted in a terg-o-tometer at 93° F. using 1.9 g/l of Greencare and 80 rpm. The wash cycle was 20 minutes and the rinse cycle was 3 minutes. A 110 ppm hardness soltuion containing a Ca to Mg ratio of 2:1 was used in both the wash and the rinse cycles. The wash load consisted of 4 swatches (4.5x6.0") of Direct Blue 1, 4 swatches (4.5x6.0") of Direct Blue 90 and 1 white cotton 400 swatch (4.5x6.0") to receive the dye from the wash solution. The dye magnets were a 4.5x6" piece of non woven cellulose of Example 15 cut up in to 4 equal pieces. The test results are summarized in Table V.

TABLE V

Dye transfer data using the treated cellulosic non woven of Example 15 as a dye magnet.

| Dye Magnet | L value of white swatch | L value of Direct Blue 1 swatch |
|---|---|---|
| None | 74.3 | 39.8 |
| Example 15 | 82.5 | 38.9 |

The data in Table V indicates that the treated cellulosic non woven of Example 15 grab dyes since, the white swatch used in the presence of these starches are lighter (higher L values) than the control indicating that it has absorbed less dye and is protected by the modified starches.

EXAMPLE 24

Use Of The Treated Zeolites Of Example 17 and 18 As A Dye Magnet.

A dye transfer test was conducted using the treated zeolites of Example 17 and 18 as a dye magnet. The test was conducted in a terg-o-tometer at 93° F. using 1.9 g/l of Greencare and 80 rpm. The wash cycle was 20 minutes and the rinse cycle was 3 minutes. A 110 ppm hardness soltuion containing a Ca to Mg ratio of 2:1 was used in both the wash and the rinse cycles. The wash load consisted of 4 swatches (4.5x6.0") of Direct Blue 1, 4 swatches (4.5x6.0") of Direct Blue 90 and 1 white cotton 400 swatch (4.5x6.0") to receive the dye from the wash solution. The dye magnets were 0.1 grams of the treated zeolites of Example 17 and 18. The test results are summarized in Table VI.

TABLE VI

Dye transfer data using the treated zeolites of Example 17 and 18.

| Dye Magnet | L value of white swatch | L value of Direct Blue 1 swatch |
|---|---|---|
| None | 72.3 | 39.7 |
| Treated zeolite of Example 17 | 76.5 | 38.8 |
| Treated zeolite of Example 18 | 79.8 | 40.5 |

The data in Table VI indicates that the modified zeolites of Example 17 and 18 grab dyes since, the white swatch used in the presence of these starches are lighter (higher L values) than the control indicating that it has absorbed less dye and is protected by the modified zeolites.

While the invention has been described with particular reference to certain embodiments thereof, it will be understood that changes and modifications may be made by those of ordinary skill in the art within the scope and spirit of the following claims.

What is claimed is:

1. A laundry article effective for inhibiting transfer of extraneous dyes and soil to articles in a wash liquor, said laundry article comprising (I) a support matrix; and (II) a functionalized polyamine attached to or entrapped in the support matrix, wherein the support matrix contains from about 0.01 to about 50 weight percent of the functionalized polyamine, based on the weight of functionalized polyamine and support matrix, and the functionalized polyamine comprises the reaction product of (A) a cyano- or guanidino-containing compound selected from the group consisting of cyanamides or salts thereof, dicyanamides or salts thereof, dicyandiamides or salts thereof, guanidines or salts thereof, biguanidines or salts thereof, and combinations thereof, and (B) a polyamine prepared from at least one monomeric amine, wherein the cyano- or guanidino-functional groups are attached to the polyamine or incorporated therein to form the functionalized polyamine, provided that the monomeric amine and the cyano- or guanidino-containing compound are present in the functionalized polyamine in a molar ratio of from about 0.1:1 to about 10:1, respectively, wherein the functionalized polyamine has the structure $$H_2N—R_1\text{--}[\text{--}N(R_2)_qR_3\text{--}]_w\text{--}[\text{--}NH_2]_x$$

wherein $R_1$ is selected from the group consisting of $C_1$–$C_{20}$ alkyl, aryl, alkaryl, and --$(CH_2CHXO)_p$--; X is selected from the group consisting of hydrogen, methyl, ethyl, propyl, phenyl, OH, and OX'; X' is selected from the group consisting of $C_1$–$C_{20}$ alkyl, aryl, and alkaryl; $R_2$ is selected from the group consisting of hydrogen, $C_1$–$C_{20}$ alkyl, aryl, alkaryl, --$(CH_2CHXO)_p$--, —$R_7$--[--$N(R_8)_rR_9$--$]_y$--[--$NH_2]_z$, and —C═$NHY_1(NY_2Y_3)$--; $R_3$ is selected from the group consisting of hydrogen, $C_1$–$C_{20}$ alkyl, aryl, alkaryl, --$(CH_2CHXO)_p$--, —$R_4R_5N$—$R_6$--, $R_{13}$--[--$N(R_{14})_s$ $R_{15}$--$]_a$--[--$NH_2]_b$ and —C═$NHY_7(NY_8Y_9)$--; $R_4$ is selected from the group consisting of $C_1$–$C_4$ alkyl, alkoxy, and alkamine; $R_5$ is selected from the group consisting of $C_1$–$C_4$ alkyl, alkoxy, and alkamine; $R_6$ is selected from the group consisting of hydrogen, $C_1$–$C_{20}$ alkyl, aryl, alkaryl, and --$(CH_2CHXO)_p$--, and —C═$NHY_7(NY_8Y_9)$--; $R_7$ is selected from the group consisting of $C_1$–$C_{20}$ alkyl, aryl, alkaryl, and --$(CH_2CHXO)_p$--; $R_8$ is selected from the group consisting of hydrogen, $C_1$–$C_{20}$ alkyl, aryl, alkaryl, --$(CH_2CHXO)_p$--, and —C═$NHY_1(NY_2Y_3)$--; $R_9$ is selected from the group consisting of hydrogen, $C_1$–$C_{20}$ alkyl, aryl, alkaryl, --$(CH_2CHXO)_p$--, —$R_{10}R_{11}N$—$R_{12}$--, and —C═$NHY_7(NY_8Y_9)$--; $R_{10}$ is selected from the group consisting of $C_1$–$C_4$ alkyl, alkoxy, and alkamine; $R_{11}$ is selected from the group consisting of $C_1$–$C_4$ alkyl, alkoxy, and alkamine; $R_{12}$ is selected from the group consisting of hydrogen, $C_1$–$C_{20}$ alkyl, aryl, alkaryl, and --$(CH_2CHXO)_p$--, and —C═$NHY_7(NY_8Y_9)$--; $R_{13}$ is selected from the group consisting of $C_1$–$C_{20}$ alkyl, aryl, alkaryl, and --$(CH_2CHXO)_p$--; $R_{14}$ is selected from the group consisting of hydrogen, $C_1$–$C_{20}$ alkyl, aryl, alkaryl, --$(CH_2CHXO)_p$--, and —C═$NHY_1(NY_2Y_3)$--; $R_{15}$ is selected from the group consisting of hydrogen, $C_1$–$C_{20}$ alkyl, aryl, alkaryl, --$(CH_2CHXO)_p$--, —$R_{16}R_{17}N$—$R_{18}$--, and —C═$NHY_7$ $(NY_8Y_9)$--; $R_{16}$ is selected from the group consisting of $C_1$–$C_4$ alkyl, alkoxy, and alkamine; $R_{17}$ is selected from the group consisting of $C_1$–$C_4$ alkyl, alkoxy, and alkamine; $R_{18}$ is selected from the group consisting of hydrogen, $C_1$–$C_{20}$ alkyl, aryl, alkaryl, and --$(CH_2CHXO)_p$--, and —C═$NHY_7$ $(NY_8Y_9)$--; $Y_1$ is a dissociated acid; $Y_2$ is selected from the group consisting of hydrogen, $C_1$–$C_{20}$ alkyl, aryl, alkaryl, and --$(CH_2CHXO)_p$--; $Y_3$ is selected from the group consisting of hydrogen, $C_1$–$C_{20}$ alkyl, aryl, alkaryl, --$(CH_2CHXO)_p$--, —C═$NHY_4(NY_5Y_6)$--, and nitrile (—C:::N); $Y_4$ is a dissociated acid; $Y_5$ is selected from the group consisting of hydrogen, $C_1$–$C_{20}$ alkyl, aryl, alkaryl, and --$(CH_2CHXO)_p$--; $Y_6$ is selected from the group consisting of hydrogen, $C_1$–$C_{20}$ alkyl, aryl, alkaryl, and --$(CH_2CHXO)_p$--; $Y_7$ is a dissociated acid; $Y_8$ is selected from the group consisting of hydrogen, $C_1$–$C_{20}$ alkyl, aryl, alkaryl, and --$(CH_2CHXO)_p$--; $Y_9$ is selected from the group consisting of hydrogen, $C_1$–$C_{20}$ alkyl, aryl, alkaryl, --$(CH_2CHXO)_p$--, —C═$NHY_{10}(NY_{11}Y_{12})$--, and nitrile (—C:::N); $Y_{10}$ is a dissociated acid; $Y_{11}$ is selected from the group consisting of hydrogen, $C_1$–$C_{20}$ alkyl, aryl, alkaryl, and --$(CH_2CHXO)_p$--; $Y_{12}$ is selected from the group consisting of hydrogen, $C_1$–$C_{20}$ alkyl, aryl, alkaryl, and --$(CH_2CHXO)_p$--; a is 1 to 5,000; b is 0 or 1; p is 1 to 6; q is 0 or 1;r is 0 or 1; s is 0 or 1; w is 1 to 5,000; x is 0 or 1; y is 1 to 5,000; z is 0 or 1, provided that when the functionalized polyamine is attached to the support matrix, a coupling agent is reacted with at least one amine group on the functionalized polyamine and at least one functional group present on the surface of the support matrix.

2. The laundry article according to claim 1 wherein the support matrix is selected from the group consisting of cellulosic fibers, non-cellulosic fibers, zeolites, starches, modified starches, and combinations thereof.

3. The laundry article according to claim 2 wherein the support matrix is a fabric sheet.

4. The laundry article according to claim 1 wherein the functionalized polyamine is attached to the support matrix by means of covalent bonds.

5. The laundry article according to claim 4 wherein the coupling agent is reacted with at least one amine group on the functionalized polyamine and at least one functional group present on the surface of the support matrix.

6. The laundry article according to claim 5 wherein the coupling agent is selected from the group consisting of formaldehyde, trichloropyrimidine, monochlorotriazine, vinyl sulfones, monofluorotriazine, difluorochloropyrimidine, dichlorotriazine, dialkyl urea wherein the alkyl group has 1 to 20 carbon atoms, and combinations thereof.

7. The laundry article according to claim 4 wherein the functional group present on the surface of the support matrix is selected from the group consisting of hydroxyl, acetyl, carboxyl, acetate, amine and combinations thereof.

8. The laundry article according to claim 1 wherein the cyano- or guanidino-containing compound is selected from the group consisting of sodium dicyanamide, dicyandiamide, guanidine, biguanidine, dimethylguanidine, sodium cyanamide, and combinations thereof.

9. The laundry article according to claim 8 wherein the cyano- or guanidino-containing compound is sodium dicyanamide or dicyandiamide.

10. The laundry article according to claim 1 wherein the polyamine (B) is prepared from a monomeric amine which is selected from the group consisting of alkyleneamines, cycloalkyleneamines, arylamines, alkylenearylamines, alkoxylatedamines, and combinations thereof.

11. The laundry article according to claim 10 wherein the monomeric amine is selected from the group consisting of hexamethylenediamine, 2-methyl-pentamethylenediamine, aziridine, ethylenediamine, 1,4-diaminobutane, 1,8-diaminooctane, 1,2-diamino-2-methylpropane, diethylenetriamine, triethylenetetraamine, tetraethylenepentaamine, pentaethylenehexaamine, piperazine, propylenediamine, dipropylenetriamine, tripropylene tetramine, 2-(2-aminoethylamino)ethanol, 2,2'-oxybis(ethylamine)dihydrochloride, and combinations thereof.

12. The laundry article according to claim 11 wherein the monomeric amine is selected from the group consisting of hexamethylenediamine, 2-methylpentamethylene diamine, and combinations thereof.

13. The laundry article according to claim 1 wherein the cyano- or guanidino-containing compound is sodium dicyanamide and the polyamine is polyhexamethylene diamine, said functionalized polyamine having the structure:

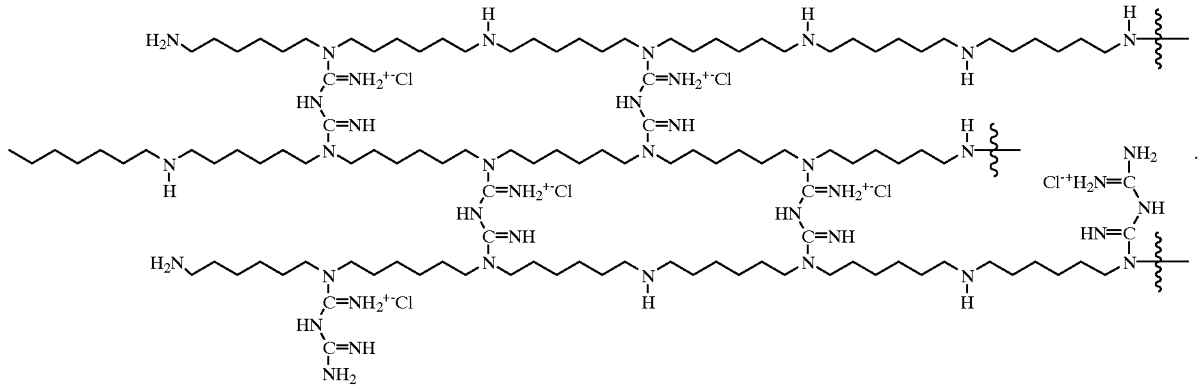

14. The laundry article according to claim 1 wherein the functionalized polyamine contains unmodified amine groups.

15. The laundry article according to claim 14 wherein the unmodified amine groups on the functionalized polyamine are oxidized.

16. The laundry article according to claim 14 wherein the unmodified amine groups on the functionalized polyamine are ethoxylated.

17. The laundry article according to claim 14 wherein the unmodified amine groups on the functionalized polyamine are quaternized.

18. The laundry article according to claim 1 wherein the polyamine (B) has a linear backbone, wherein $R_2$ is hydrogen; $R_3$ is selected from the group consisting of hydrogen, $C_1$–$C_{20}$ alkyl, aryl, alkaryl, --$(CH_2CHXO)_p$--, —$R_4R_5N$—$R_6$--, $R_{13}$--[--$N(R_{14})_sR_{15}$--$]_a$--[--$NH_2]_b$ and —C═$NHY_7(NY_8Y_9)$--.

19. The laundry article according to claim 18 wherein $R_1$ and $R_3$ are independently selected from the group consisting of hexamethylene, 2-methylpentamethylene, and biguanidine groups, with the majority of the groups being hexamethylene and 2-methylpentamethylene; $R_2$ is hydrogen, q is 1, and w is from about 2 to about 100.

20. The laundry article according to claim 1 wherein the functionalized polyamine has a linear backbone which incorporates cyclic and acyclic moieties, wherein the cyclic moiety of the functionalized polyamine is defined when q is 0; $R_3$ is —$R_4R_5N$—$R_6$--, provided that if $R_6$ is hydrogen, then x is 0; and the acyclic moiety of the functionalized polyamine is defined when q is 1; $R_2$ is hydrogen; and $R_3$ is selected from the group consisting of hydrogen, $C_1$–$C_{20}$ alkyl, aryl, alkaryl, --$(CH_2CHXO)_p$--, and —C═$NHY_7(NY_8Y_9)$--, providing that if $R_2$ and $R_3$ are hydrogen, then x is 0; if $Y_8$ and $Y_9$ are hydrogen, then x is 0; if $Y_{11}$ and $Y_{12}$ are hydrogen, then x is 0.

21. The laundry article according to claim 20 wherein the functionalized polyamine has a linear backbone which incorporates cyclic and acyclic moieties, wherein $R_4$ and $R_5$ are ethylene, $R_1$, $R_3$, and $R_6$ are independently hexamethylene, 2-methylpentamethylene, or biguanidine groups, with the majority of the groups being hexamethylene and/or 2-methylpentamethylene; w is from about 2 to about 100.

22. The laundry article according to claim 1 wherein the functionalized polyamine is multiply branched wherein $R_2$ is selected from the group consisting of $C_1$14 $C_{20}$ alkyl, aryl, alkaryl, --$(CH_2CHXO)_p$--, —$R_7$--[--$N(R_8)_rR_9$--$]_y$--[--$NH_2]_z$, and —C═$NHY_1(NY_2Y_3)$--; $R_3$ is selected from the group consisting of $C_1$–$C_{20}$ alkyl, aryl, alkaryl, --$(CH_2CHXO)_p$--, —$R_4R_5N$—$R_6$--, $R_{13}$--[--$N(R_{14})_sR_{15}$--$]_a$--[--$NH_2]_b$ and —C═$NHY_7(NY_8Y_9)$--, and q is 1.

23. The laundry article according to claim 1 wherein the monomeric amine and the cyano- or guanidino-containing compound are present in the functionalized polyamine in a molar ratio of from about 0.3:1 to about 3:1, respectively.

24. The laundry article according to claim 23 wherein the monomeric amine and the cyano- or guanidino-containing compound are present in the functionalized polyamine in a molar ratio of from about 0.8:1 to about 1.2:1.

25. The laundry article according to claim 1 wherein the support matrix contains from about 1 to about 20 weight percent of functionalized polyamine.

26. The laundry article according to claim 25 wherein the support matrix contains from about 5 to about 15 weight percent of functionalized polyamine.

27. A laundry article effective for inhibiting transfer of extraneous dyes and soil to articles in a wash liquor, said laundry article comprising (I) a support matrix; and (II) a functionalized polyamine attached to or entrapped in the support matrix, wherein the support matrix contains from about 0.01 to about 50 weight percent of the functionalized polyamine, based on the weight of functionalized polyamine and support matrix, and the functionalized polyamine comprises the reaction product of (A) a cyano- or guanidino-containing compound selected from the group consisting of cyanamides or salts thereof, dicyanamides or salts thereof, dicyandiamides or salts thereof, guanidines or salts thereof, biguanidines or salts thereof, and combinations thereof, and (B) a polyamine prepared from at least one monomeric amine, wherein the cyano- or guanidino-functional groups are attached to the polyamine or incorporated therein to form the functionalized polyamine, provided that the monomeric amine and the cyano- or guanidino-containing compound are present in the functionalized polyamine in a molar ratio of from 0.1:1 to 10:1, respectively, wherein the polyamine (B) has the structure $$H_2N—R_1\text{--}[\text{--}N(R_2)_qR_3\text{--}]_w\text{--}[\text{--}NH_2]_x$$

wherein $R_1$ is selected from the group consisting of $C_1$–$C_{20}$ alkyl, aryl, alkaryl, and --$(CH_2CHXO)_p$--; X is selected from the group consisting of hydrogen, methyl, ethyl, propyl, phenyl, OH, and OX'; X' is selected from the group consisting of $C_1$–$C_{20}$ alkyl, aryl, and alkaryl; $R_2$ is selected from the group consisting of hydrogen, $C_1$–$C_{20}$ alkyl, aryl, alkaryl, --$(CH_2CHXO)_p$--, and —$R_7$--[--$N(R_8)_r R_9$--$]_y$--[--$NH_2]_z$; $R_3$ is selected from the group consisting of hydrogen, $C_1$–$C_{20}$ alkyl, aryl, alkaryl, --$(CH_2CHXO)_p$--, —$R_4R_5$N—$R_6$--, and $R_{13}$--[--$N(R_{14})_s R_{15}$--$]_a$--[--$NH_2]_b$; $R_4$ is selected from the group consisting of $C_1$–$C_4$ alkyl, alkoxy, and alkamine; $R_5$ is selected from the group consisting of $C_1$–$C_4$ alkyl, alkoxy, and alkamine; $R_6$ is selected from the group consisting of hydrogen, $C_1$–$C_{20}$ alkyl, aryl, alkaryl, and --$(CH_2CHXO)_p$--; $R_7$ is selected from the group consisting of $C_1$–$C_{20}$ alkyl, aryl, alkaryl, and --$(CH_2CHXO)_p$--, $R_8$ is selected from the group consisting of hydrogen, $C_1$–$C_{20}$ alkyl, aryl, alkaryl, and --$(CH_2CHXO)_p$--; $R_9$ is selected from the group consisting of hydrogen, $C_1$–$C_{20}$ alkyl, aryl, alkaryl, --$(CH_2CHXO)_p$--, and —$R_{10}R_{11}$N—$R_{12}$--; $R_{10}$ is selected from the group consisting of $C_1$–$C_4$ alkyl, alkoxy, and alkamine; $R_{11}$ is selected from the group consisting of $C_1$–$C_4$ alkyl, alkoxy, and alkamine; $R_{12}$ is selected from the group consisting of hydrogen, $C_1$–$C_{20}$ alkyl, aryl, alkaryl, and --$(CH_2CHXO)_p$--; $R_{13}$ is selected from the group consisting of $C_1$–$C_{20}$ alkyl, aryl, alkaryl, and --$(CH_2CHXO)_p$--; $R_{14}$ is selected from the group consisting of hydrogen, $C_1$14 $C_{20}$ alkyl, aryl, alkaryl, and --$(CH_2CHXO)_p$--; $R_{15}$ is selected from the group consisting of hydrogen, $C_1$–$C_{20}$alkyl, aryl, alkaryl, --$(CH_2CHXO)_p$--, and —$R_{16}R_{17}$N—$R_{18}$--; $R_{16}$ is selected from the group consisting of $C_1$–$C_4$ alkyl, alkoxy, and alkamine; $R_{17}$ is selected from the group consisting of $C_1$–$C_4$ alkyl, alkoxy, and alkamine; $R_{18}$ is selected from the group consisting of hydrogen, $C_1$–$C_{20}$ alkyl, aryl, alkaryl, and --$(CH_2CHXO)_p$--;a is 1 to 5,000; b is 0 or 1; p is 1 to 6; q is 0 or 1; r is 0 or 1; s is 0 or 1; w is 1 to 5,000; x is 0 or 1; y is 1 to 5,000; z is 0 or 1; provided that when the functionalized polyamine is attached to the support matrix, a coupling agent is reacted with at least one amine group on the functionalized polyamine and at least one functional group present on the surface of the support matrix.

* * * * *